March 20, 1945.   G. W. LANGFORD ET AL   2,371,762
BALE EJECTOR FOR SCRAP METAL BALING PRESSES
Filed April 25, 1941   2 Sheets-Sheet 1
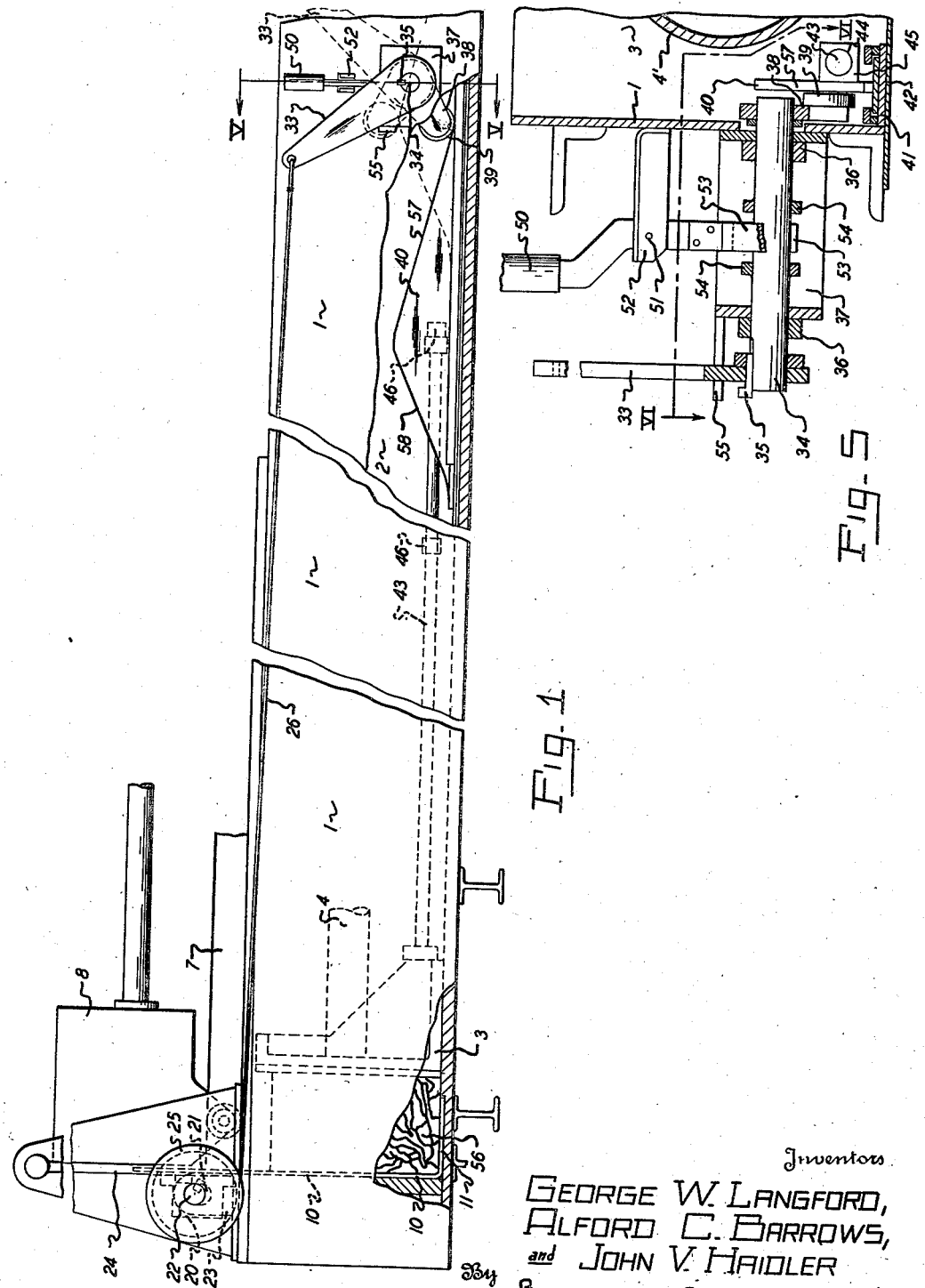
Inventors
GEORGE W. LANGFORD,
ALFORD C. BARROWS,
and JOHN V. HAIDLER
By Beaman + Langford
Attorneys March 20, 1945.    G. W. LANGFORD ET AL    2,371,762
BALE EJECTOR FOR SCRAP METAL BALING PRESSES
Filed April 25, 1941    2 Sheets-Sheet 2
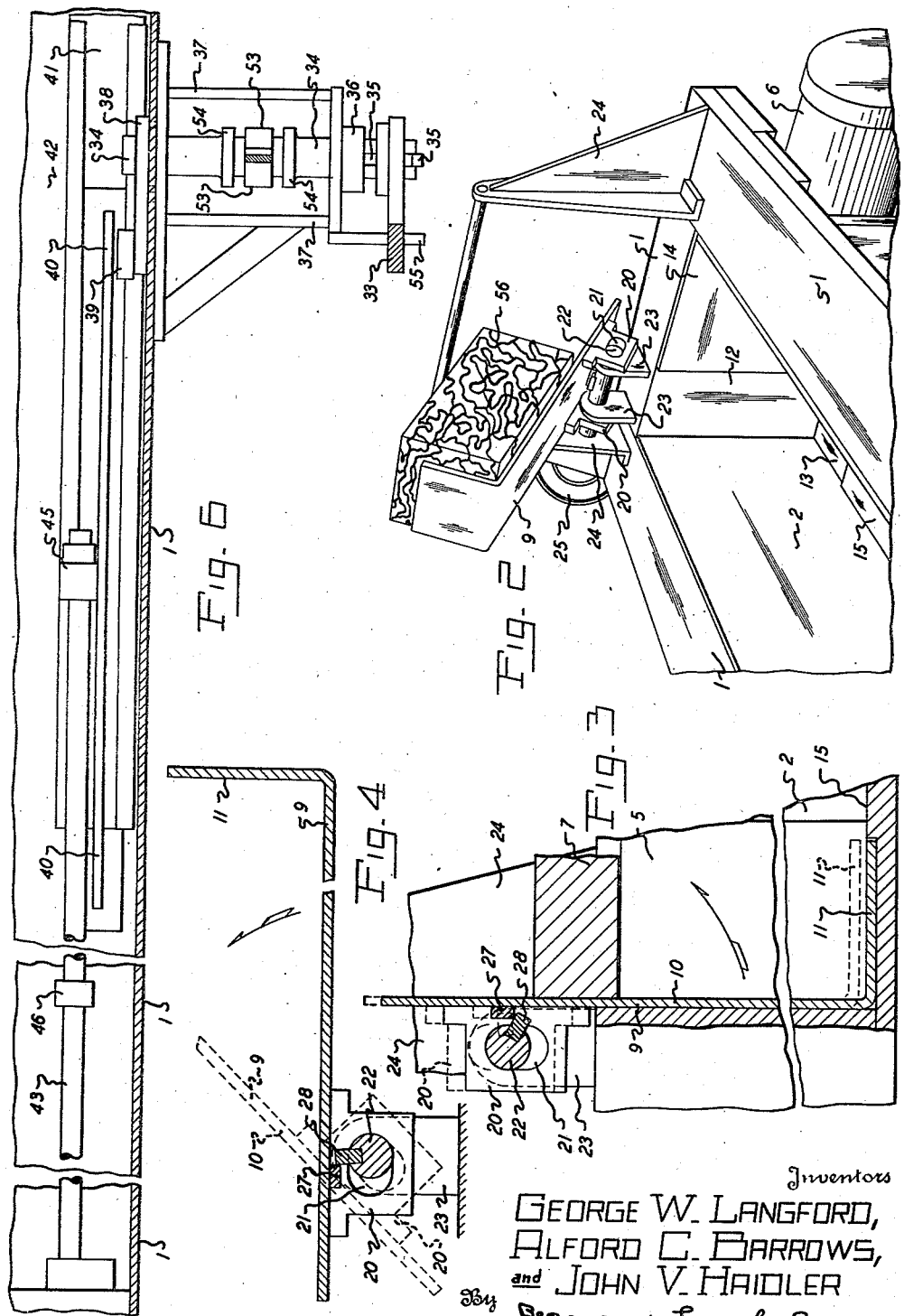
Inventors
GEORGE W. LANGFORD,
ALFORD C. BARROWS,
and JOHN V. HAIDLER
By Beaman + Langford
Attorneys Patented Mar. 20, 1945

2,371,762

UNITED STATES PATENT OFFICE 2,371,762

BALE EJECTOR FOR SCRAP METAL BALING PRESSES

George W. Langford, Alford C. Barrows, and John V. Haidler, Ann Arbor, Mich., assignors to Economy Baler Company, Ann Arbor, Mich., a corporation of Michigan Application April 25, 1941, Serial No. 390,240

14 Claims. (Cl. 78—0.5)

The present invention relates to baling presses and more particularly to horizontal baling presses for baling sheet metal scrap which are provided with ejectors for automatically removing finished bales therefrom.

Bales of sheet metal scrap weigh approximately 250 pounds each, and present a difficult problem when they are to be removed manually. According to the present invention, mechanical means are provided for ejecting finished bales, the ejector comprising a structure on which bales are formed. In the preferred arrangement a cam actuated by the compressing platen actuates the ejector. The cam is so arranged that as the compressing platen is withdrawn after forming a bale, the ejector is automatically actuated.

Accordingly, an object of the present invention is to provide a structure for automatically ejecting scrap metal bales from the baling members in which they are formed.

Another object of the invention is to provide a structure on which scrap metal bales are formed and mechanism for moving the structure to lift the formed bales out of the baling chamber.

Another object of the invention is to provide an automatic bale ejector selectively operable from a part of the baling mechanism.

Still another object of the invention is to provide a bale ejector comprising a structure on which the bale is formed, the structure being pivoted at a point outside of the baling chamber and being oscillatable by a selectable connection with an operative part of the baling mechanism to lift a bale from the chamber in which it is formed.

These and other objects residing in the arrangement, construction and combination of the parts will be apparent from the following specification when taken with the accompanying drawings, in which Fig. 1 is a side view partially in section disclosing the invention, Fig. 2 is a partial perspective view of one end of the construction disclosed in Fig. 1, Fig. 3 is a partial vertical enlarged section of the structure disclosed in Fig. 1 disclosing details, Fig. 4 is a section corresponding to the disclosure of Fig. 3, showing the parts thereof in successive positions during operation, Fig. 5 is a section on the line V—V of Fig. 1, and Fig. 6 is a section on the line VI—VI of Fig. 5.

Referring particularly to the drawings, reference character 1 indicates the frame of a baling press similar to that shown in the copending application of George W. Langford et al., executed April 22, 1941, and filed on even date herewith. As shown particularly in Fig. 2, the frame 1 is provided with a baling chamber 2. Reciprocable in the chamber 2 is a compressing platen 3 movable by piston rod 4, actuated by a piston not shown, in the cylinder 4' shown in Fig. 5. Also disposed in the chamber 2 is a compressing platen 5 shown particularly in Fig. 3 and movable in a direction at right angles to the movement of the platen 3 by a piston not shown in a cylinder 6 shown in Fig. 2. Movable over the baling chamber 2 by some suitable mechanism is a cover 7 which fits in the top of the baling chamber 2, as shown particularly in Fig. 3. If desired the mechanism for closing the cover 7 may include a cover supporting carriage 8, shown particularly in Fig. 1 and more fully disclosed in the aforesaid copending application.

Disposed in the forward end of the baling chamber 2 is an ejector 9 provided with a back plate 10, and a foot 11. The back plate 10 and the foot 11 are normally disposed in recesses 12 and 13 respectively, shown most clearly in Fig. 2, the depth of the recesses 12 and 13 being such that the back plate 10 and foot 11 are flush with the end wall 14 and the bottom 15 respectively, of the chamber 2. The back plate 10 of the ejector 9 is provided with a pair of spaced ears 20, each having an elongated slot 21. A shaft 22 projects through the slots 21 and is supported by bearing members 23 supported by the frame 1. The positions of the slots 21, shaft 22, and the ejector 9 are such that when the foot 11 of the ejector 9 is disposed in the recess 13, shown particularly in full lines in Fig. 3, the shaft 22 bears against the upper ends of the slots 21 in the ears 20.

One end of the shaft 22 extends through one of the upright brackets 24 with which the frame 1 is provided and projects over one side of the frame 1. The projecting end of the shaft 22 is provided with a sheave or drum 25, which has a cable 26, shown particularly in Fig. 1, wrapped therearound and anchored thereto. When tension is applied to the cable 26, the shaft 22 is rotated in a counterclockwise direction as viewed in Fig. 3.

Secured to the back plate 10 of the ejector 9, substantially opposite the shaft 22, as shown particularly in Fig. 3, is a lug 27, and secured to the shaft 22, preferably by recessing and welding, is a projection 28. When the ejector 9 is in its full line position, as shown in Fig. 3, the projection 28 is immediately below the lug 27.

However, when the cable 26 is tensioned by suitable drawing mechanism to be hereinafter described, the shaft 22 is rotated in a counterclockwise direction causing the projection 28 to bear against the bottom of the lug 27. The initial result of the projection 28 bearing against the lug 27 is to elevate the ejector 9 to the dotted line position disclosed in Fig. 3. At this position of the ejector 9, the bottoms of the slots 21 in the ears 20 are against the bottom of the shaft 22, the vertical movement being permitted by the slots 21. Continued rotation of the shaft 22 urging the projector 28 against the lug 27 causes the ejector 9 to oscillate out of the baling chamber 2 through the full line position as shown in Fig. 4 to the inclined position shown in dotted lines in Fig. 4.

The mechanism for tensioning the cable 26 comprises a cable arm 33, shown particularly in Figs. 1, 5 and 6, secured to a rock shaft 34 by a key 35. The rock shaft 34 is pivotally supported by bearing members 36, supported by a frame 37, carried by the frame 1 as shown particularly in Fig. 5. The shaft 34 extends through the frame 1 and has secured to the extending portion thereof a follower arm 38 to which is pivotally secured a follower roller 39. The cable arm 33 and the follower arm 38 are disposed on the shaft 34 in the relative positions shown particularly in Fig. 1.

For rocking the shaft 34 there is provided a cam 40 slidable in a guideway 41 secured to the bottom 42 of the frame 1, shown particularly in Fig. 5.

The cam 40 is reciprocated by a rod 43 secured at one end to the platen 3 and at the other end passing through a bore 44 in a block 45 secured to one side of the cam 40. Fixed to the rod 43 on either side of the block 45 are stops 46. The arrangement is such that the cam 40 is moved when one or the other of the stops 46 abuts against the block 45. The spacing of the stops 46 provides a lost motion connection between the rod 43 and the cam 40.

The follower roller 39 is arranged to be moved into and out of the path of movement of the cam 40 by an actuating lever 50 under the control of the operator of the baling press. The actuating lever 50 is pivoted about a pin 51 supported by a bracket 52 carried by the frame 1. The lower end of the lever 50 is provided with spaced portions 53, extending on opposite sides of the shaft 34. Disposed about the shaft 34 on opposite sides of the portions 53, are collars 54. Thus as the actuating lever 50 is pivoted about the pin 51, the portions 53 engage with one or the other of the collars 54 to axially shift the rock shaft 34. In the position shown in Fig. 5 the shaft 34 is at its leftmost position with the follower roller 39 out of the path of movement of the cam 40. In order to move the follower roller 39 into the path of movement of the cam 40, it is merely necessary to swing the actuating lever 50 in a counterclockwise direction as viewed in Fig. 5 to thrust the rock shaft 34 to the right. In order to prevent the rock shaft 34 from rocking in a counterclockwise direction, as viewed in Fig. 1, a sufficient distance to make it impossible for the follower roller 39 to move over the low end of the cam 40, there is provided a stop 55, shown particularly in Figs. 1 and 5, projecting from the housing 37, against which the cable arm 33 abuts.

The operation of the invention is as follows: Scrap metal to be baled is deposited in the baling chamber 2. The cover 7 is then closed and the platens 3 and 5 are actuated to compress the scrap metal to form a bale 56 on the ejector 9. The cover 7 is opened by moving it substantially horizontally and rearwardly in a manner which may be any known in the art, or as described in the above identified copending application. The platen 5 is moved sidewise of the chamber 2 to its rearmost position and the platen 3 is moved rearwardly. As the platen 3 moves rearwardly it axially moves the rod 43 rearwardly, sliding the same through the bore 44 in the block 45 attached to the cam 40. When the forward stop 46 abuts against the block 45, the cam 40 starts to move rearwardly. By this time the lever 50 should have been actuated to place the follower roller 39 in the path of movement of the cam 40. As the cam 40 moves rearwardly the follower roller 39 rolls up the inclined face 57 thereof to rock the rock shaft 34 in a clockwise direction as viewed in Fig. 1. This action swings the cable arm 33 in a clockwise direction as viewed in Fig. 1 to draw on the cable 26, and since the cable 26 is wrapped about the sheave or drum 25 to rotate the shaft 22, the rotation of the shaft 22 causes the projection 28 to bear against the lug 27 to first elevate the ejector 9 from the recess 13 in which the foot 11 thereof is disposed and then to swing the ejector 9 out of the baling chamber 2 to the position shown in Fig. 4 to lift the bale 56 from the chamber 2 until the back plate 10 of the ejector 9 is in the dotted line position shown in Fig. 4. In this position the bale 56 slides from the ejector 9 either onto the ground outside of the baling press or into some container which may be provided if desired.

When the follower roller 39 reaches the apex of the cam 40 the ejector 9 is in its dotted line position, shown in Fig. 4. As the cam 40 continues to move rearwardly the follower roller 39 moves down the inclined face 58 of the cam 40, thus permitting the rock shaft 34 to rotate in a counterclockwise direction as viewed in Fig. 1, and the cable arm 33 to swing in the same direction. This movement of the cable arm 33 permits the weight of the ejector 9 to cause it to swing about the shaft 22 to return the ejector 9 to its position within the baling chamber 2 with its back plate 9 in the recess 12 and its foot 11 in the recess 13 ready for another baling action.

The baling press at this point in the operation is ready to have scrap metal to be baled again deposited in the baling chamber 2. However, before the platen 3 is moved forwardly to compress the scrap metal in the baling chamber 2, the lever 50 should be swung in a clockwise direction as viewed in Fig. 5 to move the follower roller 39 from the path of the cam 40. Thus, as the platen 3 moves forwardly on its compressing stroke, the cam 40 is inoperative to affect the position of the ejector 9. As the platen 3 moves forward on its compressing stroke, it draws after it the rod 43 which slides through the bore 44 in the block 45 until the rear stop 46 engages with the block 45. Then the cam 40 is moved forwardly into position to actuate the ejector 9 upon rearward movement of the platen 3 as above described. The lost motion provided by the space between the stops 46 has the result of providing only the necessary longitudinal movement of the cam 40, notwithstanding the total movement of the platen 3.

While the ejector has been described as associated with a particular form of baling press, it will be understood that the ejector provided by the present invention may be employed in association with any baling press where the bale may be formed on the ejector.

Having thus described our invention, what we desire to secure by Letters Patent and claim is:

1. In a baling press of the character described having a frame provided with a compressing chamber and mechanism to form a bale or the like therein, bale ejecting means in said chamber upon which said bale is formed, means supporting said ejecting means for limited vertical movement and for oscillation about an axis outside of said chamber, and means arranged to be selectively operably connected to a part of said mechanism to lift said ejecting means a limited distance and to swing said ejecting means about said axis out of said chamber, whereby a bale formed thereon is lifted from said chamber.

2. In a baling press of the character described having a frame provided with a compressing chamber, said chamber having side walls and a bottom and mechanism to form a bale or the like therein, bale ejecting means in said chamber upon which the bale is formed, said bale ejecting means comprising a vertical member adapted to be disposed adjacent one side of said chamber, and a foot connected to said vertical member adapted to be disposed adjacent the bottom of said chamber, a recess in the bottom of said chamber for receiving said foot, means supporting said ejecting means for oscillation about an axis outside of said chamber, means to elevate said ejecting means to lift said foot from said recess, and means to swing said ejecting means about said axis from said chamber, whereby a bale formed on said ejecting means is lifted from said chamber.

3. In a baling press of the character described having a frame provided with a compressing chamber, said chamber having side walls and a bottom and mechanism to form a bale or the like therein, bale ejecting means in said chamber upon which the bale is formed, said bale ejecting means comprising a vertical member adapted to be disposed adjacent one side of said chamber, and a foot connected to said vertical member adapted to be disposed adjacent the bottom of said chamber, a shaft supported outside of said chamber, means for supporting said ejecting means for oscillation about the axis of said shaft, said ejecting means having a portion thereof extending in contiguous relation to said shaft, a projection on said shaft, a lug on said portion of said ejecting means for being engaged by said projection, and means for rotating said shaft to move said projection into operative engagement with said lug to swing said ejecting means from said chamber, whereby a bale formed on said ejecting means is lifted from said chamber.

4. In a baling press of the character described having a frame provided with a compressing chamber, said chamber having side walls and a bottom and mechanism to form a bale or the like therein, bale ejecting means in said chamber upon which the bale is formed, said bale ejecting means comprising a vertical member adapted to be disposed adjacent one side of said chamber, and a foot connected to said vertical member adapted to be disposed adjacent the bottom of said chamber, a recess in the bottom of said chamber for receiving said foot, a shaft supported outside of said chamber, means for supporting said ejecting means for oscillation about the axis of said shaft, a portion of said ejecting means extending into contiguous relation with said shaft, a projection on said shaft, a lug on said portion of said ejecting means, means to rotate said shaft to bring said projection into engagement with said lug, and means associated with said means for supporting said ejecting means for permitting said ejector to be elevated, upon engagement of said projection with said lug, to lift said foot from said recess and upon continued rotation of said shaft to swing said ejecting means from said chamber, whereby a bale formed on said ejecting means is lifted from said chamber.

5. In a baling press of the character described having a frame provided with a compressing chamber having substantially vertical side walls and a substantially horizontal bottom and mechanism to form a bale or the like therein, bale ejecting means in said chamber on which a bale is adapted to be formed, comprising a plate recessed in one of said vertical walls, a foot plate secured to the lower end of said first named plate at substantially right angles thereto and recessed in said bottom, means to support said first named plate for oscillation about an axis outside of said chamber, and means to slide said first named plate substantially vertically in its recess to lift said foot plate from its recess and then to swing said ejecting means from said chamber, whereby a bale formed on said ejecting means is lifted from said chamber.

6. In a baling press of the character described having a frame provided with a compressing chamber having substantially vertical side walls and a substantially horizontal bottom and mechanism to form a bale or the like therein, bale ejecting means in said chamber on which a bale is adapted to be formed, comprising a plate recessed in one of said vertical walls, a foot plate secured to the lower end of said first named plate at substantially right angles thereto and recessed in said bottom, a shaft supported outside of said chamber, means to support said first named plate for oscillation about the axis of said shaft, means to rotate said shaft, and means associated with said shaft and said first named plate operative upon rotation of said shaft to slide said first named plate substantially vertically in its recess to lift said foot plate from its recess and then to swing said ejecting means from said chamber, whereby a bale formed by said ejecting means is lifted from said chamber.

7. In a baling press of the character described, a frame provided with a compressing chamber and mechanism including a platen to form a bale therein, bale ejecting means in said chamber on which a bale is formed, mechanism operatively connected to said platen to actuate said ejecting means to remove a bale from said chamber and to return said ejecting means to normal position in said compressing chamber, as said platen is withdrawn to starting position after a compressing stroke, and means to disconnect said operative connection during the compressing stroke of said platen.

8. In a baling press of the character described, having a frame provided with a compressing chamber and mechanism including a platen to form a bale therein, bale ejecting means in said chamber on which said bale is formed, a cam movable with said platen, a follower for said cam, mechanism operably connecting said follower to said ejecting means to actuate said ejecting means, and means to selectively move said follower into and out of the path of movement of said cam, said cam being arranged to actuate said follower to operate said ejecting means and return the same to normal position in said compressing chamber as said platen is withdrawn, and said means for moving said follower being operable to move said follower from the path of movement of said cam during the compressing stroke of said platen.

9. In a baling press of the character described having a frame provided with a compressing chamber and mechanism including a baling platen to form a bale or the like therein, bale ejector means in said chamber upon which the bale is formed, means for actuating said ejector including a cam, an actuating connection between said platen and said cam for actuating said cam by said platen, a follower for said cam, an operative connection between said follower and said ejector means for actuating said ejector means by said follower, and means for selectively moving said follower into the path of said cam for actuation thereby, whereby a predetermined movement of said cam actuates said ejector, said cam being shaped to move said ejector to eject a bale thereon and to return said ejector into said baling chamber in a position to have a subsequent bale formed thereon, said cam being arranged so that both ejector movements take place during the return of the platen from its full forward compressing position to its starting rearward position following the forming of a bale.

10. In a baling press of the character described having a frame provided with a compressing chamber and mechanism to form a bale or the like therein, bale ejector means in said chamber upon which the bale is formed, means for actuating said ejector including a cam, an operative connection between said cam and a part of said mechanism for actuating said cam thereby, a rocker arm, a cam follower connected to said rocker arm, mechanism providing an operative connection between said rocker arm and said ejector means for actuating said ejector means by said rocker arm, and means to selectively move said cam follower into operative relation with said cam for causing said rocker arm to be rocked by said cam to operate the parts actuating said ejector, said cam being shaped to move said ejector to eject a bale thereon and to return said ejector into said baling chamber in a position to have a subsequent bale formed thereon and said cam being arranged so that both ejector movements take place during the return of the platen from its full forward compressing position to its starting rearward position following the forming of a bale.

11. In a baling press of the character described having a frame provided with a compressing chamber and mechanism including a platen to form a bale or the like therein, bale ejector means in said chamber upon which said bale is formed, means supporting said ejector means for oscillation about an axis outside of said chamber, a cam, an operative connection between said platen and said cam for actuating said cam by said platen, means to swing said ejector means about said axis from said chamber including a follower for said cam, an operative connection between said follower and said ejector means for actuating said ejector means by said follower, and means to selectively move said follower into and out of the path of movement of said cam, whereby upon predetermined movement of said platen said cam is operative at will to swing said ejector means from said baling chamber for lifting from said chamber a bale formed on said ejector means, said cam being shaped to move said ejector to eject a bale thereon and to return said ejector into said baling chamber in a position to have a subsequent bale formed thereon and said cam being arranged so that both ejector movements take place during the return of the platen from its full forward compressing position to its starting rearward position following the forming of a bale.

12. The invention as defined in claim 11 wherein there is a lost motion connection between said platen and said cam whereby there is provided a movement of said cam by said platen during only a predetermined part of the movement of said platen.

13. In a baling press of the character described having a frame provided with a compressing chamber and mechanism including a platen to form a bale or the like therein, bale ejector means in said chamber upon which said bale is formed, means supporting said ejector means for oscillation about an axis outside of said chamber, a cam, an operative connection between said platen and said cam for actuating said cam by said platen, means to swing said ejector means about said axis from said chamber including a rock shaft, a follower arm connected to said rock shaft, a follower on said follower arm for operative engagement with said cam, a second arm on said rock shaft, and an operative connection between said second arm and said ejector means, whereby upon a predetermined movement of said platen, said cam is operative to rock said rock shaft to swing said ejector means from said baling chamber for lifting from said chamber a bale formed on said ejector means.

14. The invention as defined in claim 13 wherein the rock shaft is axially slidable at will to move the follower into and out of the path of movement of the cam, whereby upon a predetermined movement of said platen, said cam is operative at will to swing said ejector means from said baling chamber and for lifting from said chamber a bale formed on said ejector means.

GEORGE W. LANGFORD.
ALFORD C. BARROWS.
JOHN V. HAIDLER.